Aug. 17, 1965  J. T. FEENEY ETAL  3,200,688
SAWING MACHINE

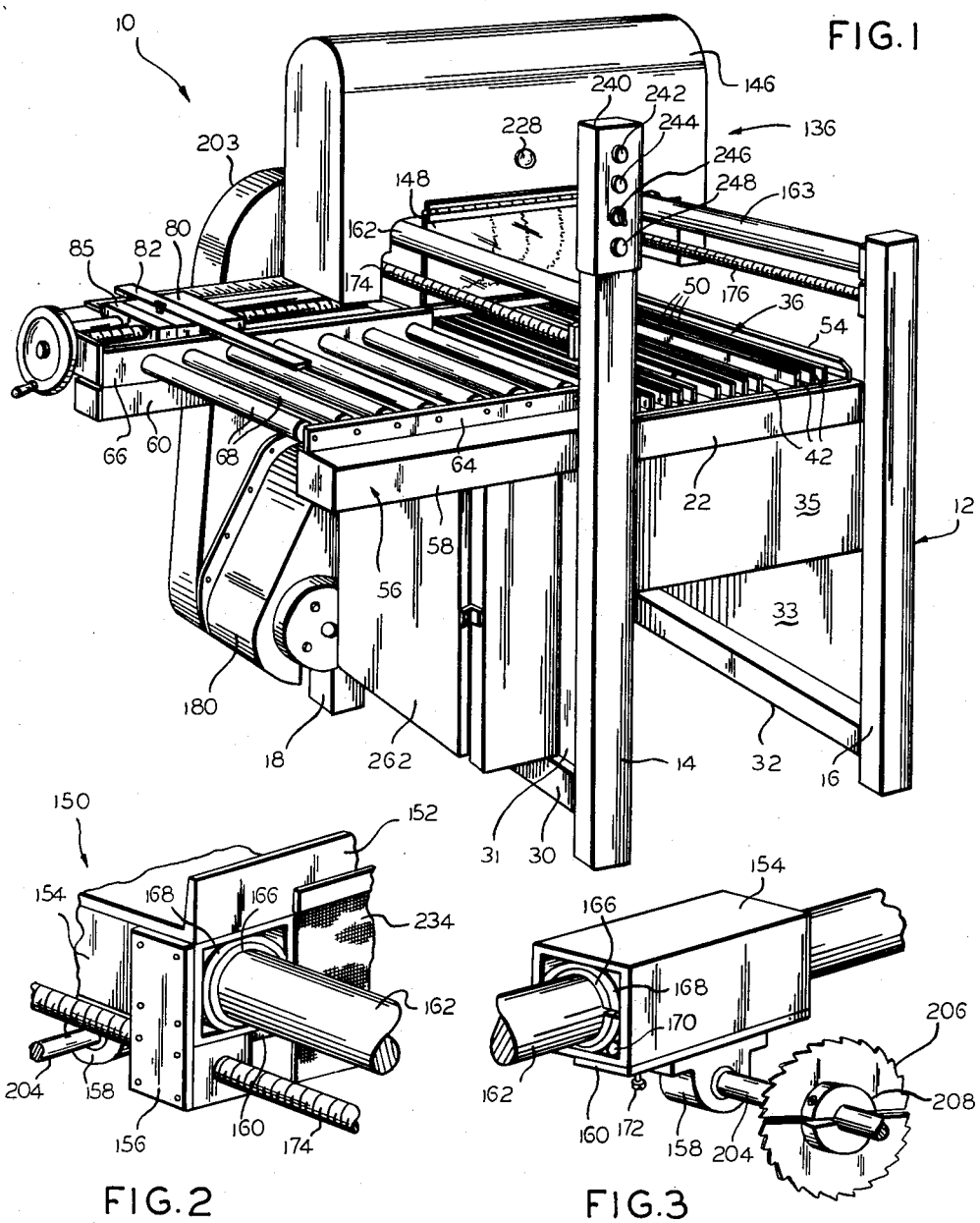

Filed Oct. 11, 1962  6 Sheets-Sheet 2

INVENTORS
JACK T. FEENEY
HENRY F. THIELE, JR.
BY EDWIN G. KORIATH

Prangley, Baird, Clayton, Miller + Vogel
ATTORNEYS

INVENTORS
JACK T. FEENEY
HENRY F. THIELE, JR.
BY EDWIN G. KORIATH

ATTORNEYS

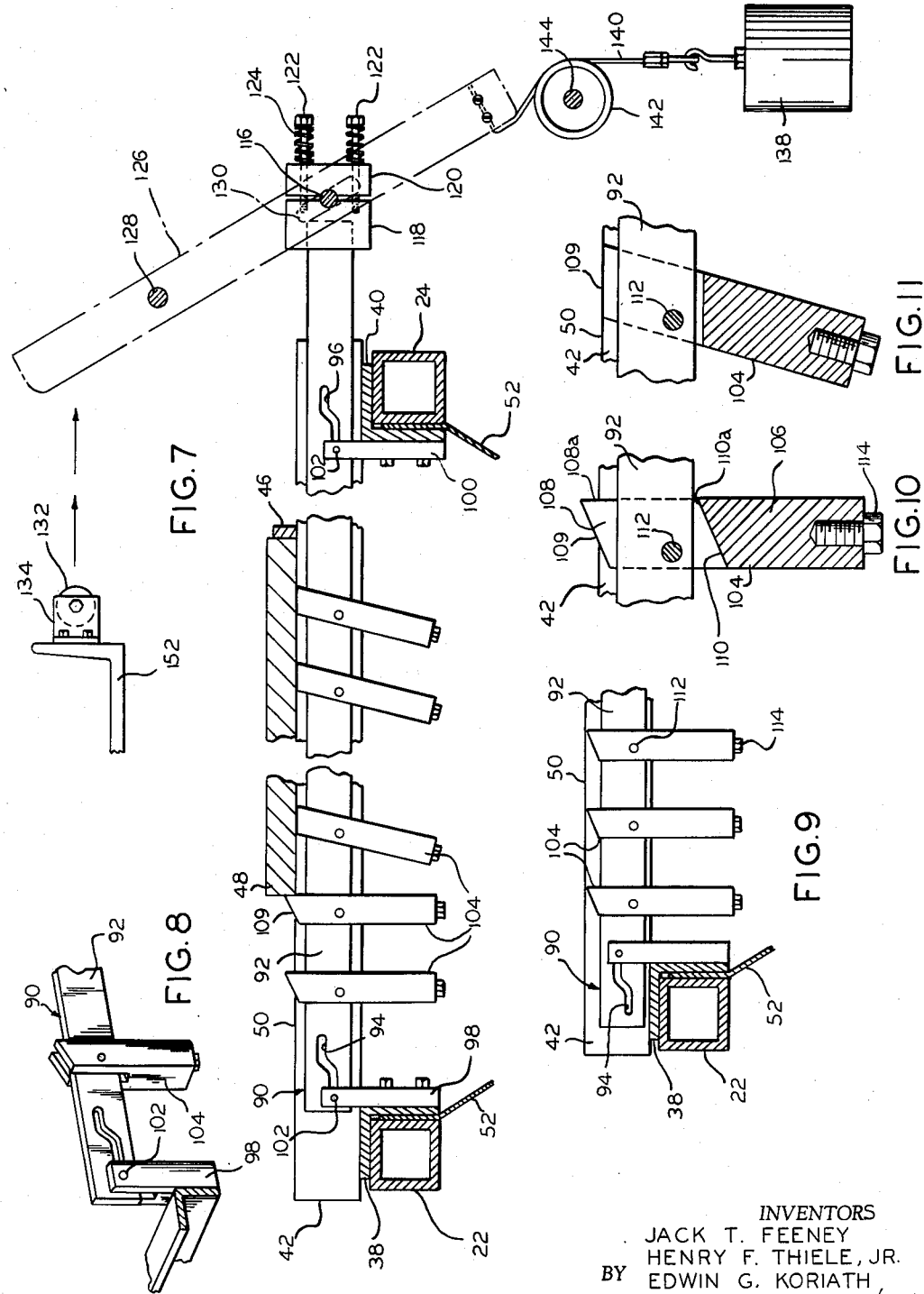

INVENTORS
JACK T. FEENEY
HENRY F. THIELE JR.
BY EDWIN G. KORIATH

ATTORNEYS

United States Patent Office 3,200,688
Patented Aug. 17, 1965

3,200,688
SAWING MACHINE
Jack T. Feeney, Schiller Park, Henry F. Thiele, Jr., Wheaton, and Edwin G. Koriath, Itasca, Ill., assignors to Graphic Saw, Inc., Chicago, Ill., a corporation of Illinois
Filed Oct. 11, 1962, Ser. No. 229,801
7 Claims. (Cl. 83—383)

This invention relates to a sawing machine adapted for automatic or semiautomatic operation. The machine may be employed for sawing various articles rapidly and accurately, and is especially useful for sawing metal plates in printing plant operations.

In printing newspapers and the like, pages are initially made up by locking type and blocks in a chase. The blocks are sized to column widths, and cuts are mounted on the blocks. Fillers are commonly used in the chase for proper alignment and tight locking.

The blocks used in the chase are sawed from cast lead plates or slabs. The blocks are cut in various column widths and depths, and appropriate sizes are selected in making up the pages. Sawing operations in the past have required excessive time and labor, and often, they have hazardous. Thus, it has been necessary for an operator working with a single rotary saw blade mounted on a stand, to saw individual sections of various column widths from a plate, making the necessary adjustments before each cut. Thereafter, the sections are turned and sawed for suitable depths in like manner, to provide a number of blocks in various combinations of widths and depths.

In addition to being laborious, such methods frequently are inaccurate. The inaccuracies must be corrected by the use of fillers in the chase.

An important object of the present invention is to provide a new and improved sawing machine which overcomes these and other disadvantages previously encountered.

Another object is to provide a sawing machine which automatically clamps an article securely for sawing it into sections and releases the sections when sawing is complete.

An additional object is to provide a sawing machine which is automatically operated to saw a plate or slab into a plurality of sections of predetermined sizes for use in printing and other operations. The sawing machine provides a full range of column widths for newspaper printing.

Another object is to provide a sawing machine which accommodates various sizes and groupings of one or several articles to be sawed. In particular, the sawing machine includes universal clamp means for securely holding such articles in place during operation.

An additional object is to provide a sawing machine which is compact, convenient, strong and durable, and operates reliably over a long useful life.

These and other objects, advantages and functions of the invention will be apparent on reference to the specification and to the attached drawings illustrating a preferred embodiment of the invention, wherein like parts are identified by like reference symbols in each of the views, and wherein:

FIGURE 1 is a front and side perspective view of one embodiment of the sawing machine, showing the machine in its starting position;

FIG. 2 is an enlarged fragmentary perspective rear view of a part of a saw head in the machine, illustrating the manner of mounting and driving the same;

FIG. 3 is a similar view taken from the opposite side and with parts removed;

FIG. 7 is an enlarged broken side elevational view of clamp means in the machine and associated structure for operating the same, in a clamping position thereof, illustrating the manner in which a plate to be sawed is clamped on the bed grate;

FIG. 8 is a fragmentary perspective view of the front end of the clamp means, in the same position as illustrated in FIG. 7;

FIG. 9 is a fragmentary side elevational view of the front end of the clamp means, similar to the view of FIG. 7 but with the clamp means in release position thereof;

FIGS. 10 and 11 are further enlarged vertical sectional views of a clamping element, respectively illustrating two different positions assumed by the element in operation of the machine.

Figure 4:
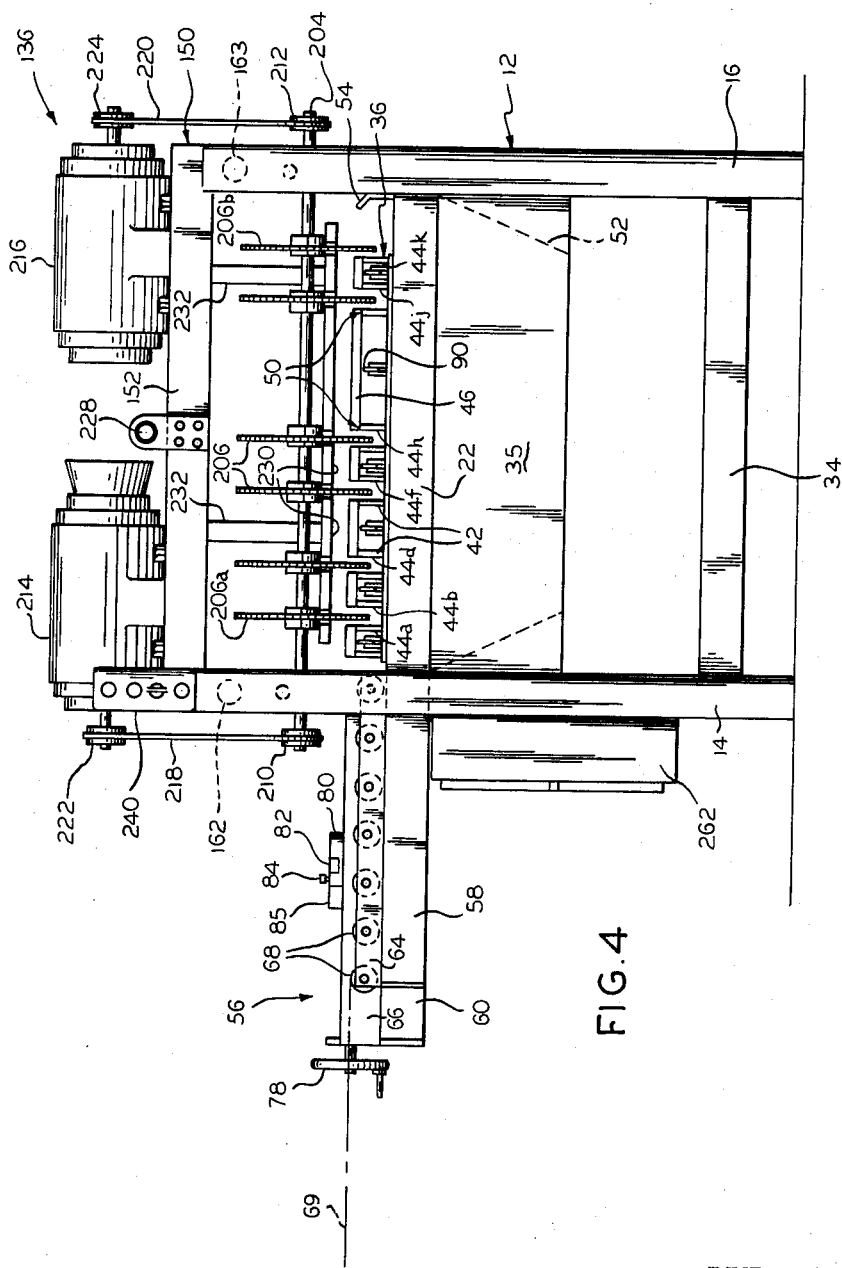
FIG. 4 is a front elevational view of the machine, with outer covering removed.

The invention provides a sawing machine including a bed for supporting an article to be sawed, and a saw head mounted for traversing movement relative to the bed. Clamp means are provided for clamping an article to be sawed on the bed, and the clamp means are operated cooperatively with the saw head. The preferred structure includes universal clamp means for clamping articles of various lengths or depths on the bed, and adjustable lateral margin guide means for sawing articles into sections of various widths.

The preferred embodiments of the invention further include a plurality of saw blades mounted in the saw head for making a plurality of cuts in an article at one time. The clamp means includes a plurality of clamps which engage the article between the saw blades, to hold the article during the sawing operation and to hold the sections into which the article is sawed during withdrawal of the saw blades. The machine is especially adapted for use as a stereotype base sawing machine, sawing a base plate into a plurality of sections having single or multiple column widths. One or more of these sections may be sawed into blocks of various depths. The machine accommodates different plate sizes, and diverse sizes and quantities of plate sections may be sawed into blocks together.

Referring to the drawings, a preferred embodiment of the sawing machine is shown completely assembled and generally indicated by the number 10 in FIG. 1. As seen in this view and in FIGS. 4–6, the latter views illustrating the machine with parts removed, the sawing machine includes a rectangular frame 12 having upstanding pairs of front and rear legs of rectangular tubular construction, numbered respectively 14 and 16, and 18 and 20. The front and rear legs are connected on opposite sides of the machine by horizontal upper crossbars 26 and 28 (FIG. 5) and lower crossbars 30 and 32 (FIG. 1) of rectangular tubular construction. Side wall panels 31 and 33 are provided on respective sides, and they extend between the front and rear legs, and the upper and lower crossbars.

Figure 5:
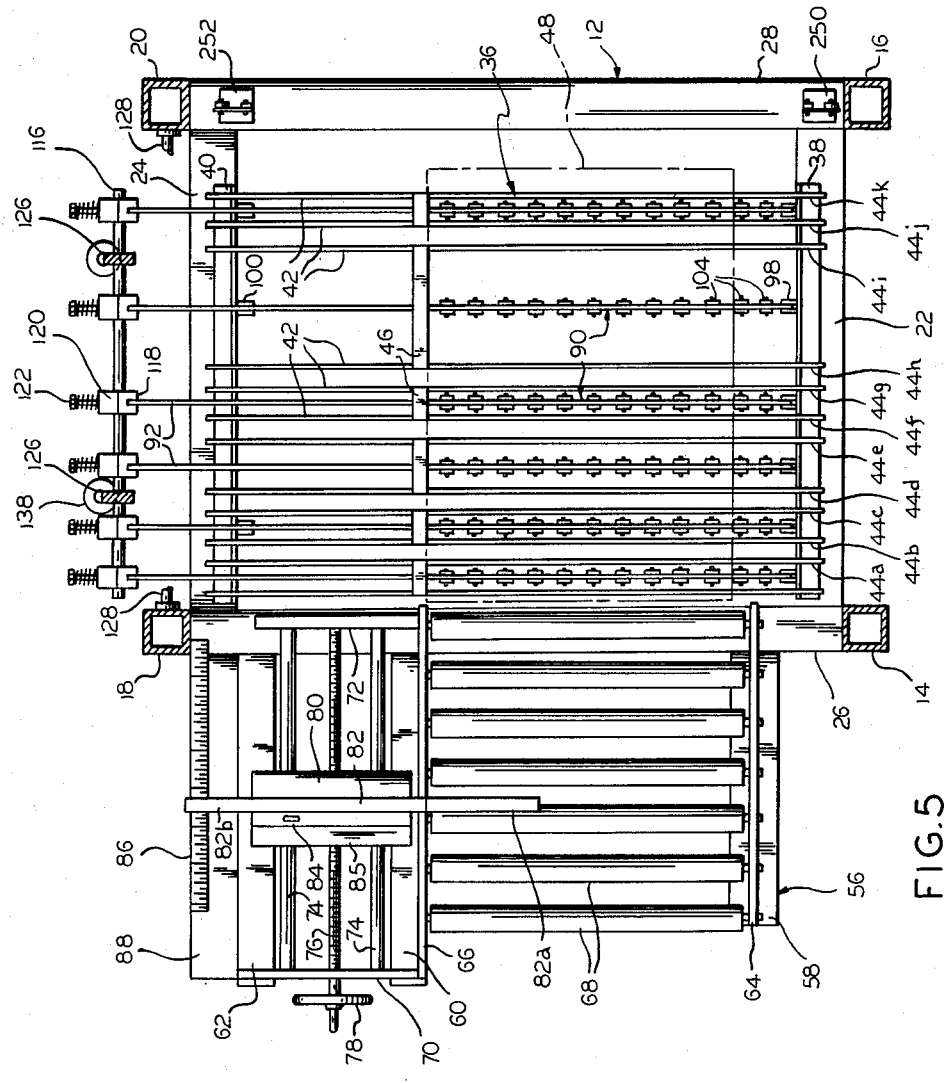
FIG. 5 is a horizontal sectional view of the machine with the saw head and covering removed, and showing a bed grate and adjoining table thereof in top plan view.

As seen in FIG. 5, the front and rear pairs of legs are interconnected by horizontal upper crossbars 22 and 24, respectively, of rectangular tubular construction. As seen in FIG. 4, the rear legs are interconnected by a similar horizontal lower crossbar 34. A front wall panel 35 depends from the front crossbar 22 and extends between the front legs. The lower ends of the front legs are unconnected, and the lower half of the machine is open at the front, as seen in FIG. 1. The structure accommodates a waste truck or dolly which is inserted for collecting and removing waste material from beneath the work bed, as subsequently described.

As seen in FIGS 1, 4 and 5, a work bed 36 is mounted on the upper front and rear crossbars 22 and 24. Referring also to FIG. 7, the bed is constructed of front and rear angle bars 38 and 40 secured to the respective crossbars. A plurality of spaced parallel narrow rectangular support bars 42 stand on edge on the angle bars and extend therebetween. The support bars are secured to the angle bars by suitable means, such as welding. The support bars form a bed grate having a corresponding plurality of open vertical channels between the bars, the respective channels being identified by the numbers 44a–k, as seen especially in FIG. 5. A discontinuous transverse backstop 46 in the form of an aligned plurality of upright narrow rectangular bars is secured on top of the support bars 42 and defines the rear margin of the work surface of the work bed 36. As illustrated in FIG. 7, the bed thus is constructed for supporting an article 48, such as a lead plate, slab or the like, on the upper surface 50 of the bed, with the inner or rear edge or end of the article abutting on the backstop 46.

Referring to FIGS. 1, 4, 6 and 7, a waste chute 52 of truncated pyramidal configuration is arranged at the base of the work bed 36 and is enclosed within the side wall panels 31 and 33 and the front wall panel 35. The chute is secured to the upper horizontal crossbars, as illustrated for the crossbars 22 and 24 in FIG. 7. An integral elongated flange 54 extends upwardly from front to rear along one upper side crossbar 28 and is bent towards the bed, for collecting waste material therealong. The chute is designed to discharge into a portable waste bin (not shown), mounted on a truck or dolly and placed beneath the chute. The waste bin may be moved into position from the front of the machine 10, passing between the front legs 14 and 16 and beneath the front wall panel 35.

As seen in FIGS. 1, 4 and 5, a side table 56 laterally adjoins the work bed 36. The table is mounted on the left side of the frame 12, as viewed from the front and as seen in FIG. 4, by means of horizontal side bars 58, 60 and 62. The side bars are secured to the upper side crossbar 26, and extend laterally from front to rear in spaced parallel relation. Roller mounting bars 64 and 66 are secured on their edges on the respective side bars 58 and 60, and they terminate on the side crossbar 26 adjacent to the work bed 36. A plurality of cylindrical rollers 68 extend longitudinally in spaced parallel relation between the mounting bars and are rotatably mounted thereon. As seen particularly in FIG. 4, the rollers provide a supporting surface for a plate or other article, which surface comprises the uppermost points on the rollers lying in a horizontal plane 69 tangential thereto and substantially coplanar with the upper bed surface 50.

A plate 48 (FIG. 5) or other article to be sawed may be placed on the rollers 68 and moved thereon partly or completely onto the work bed. When a portion of the plate remains on the table, its rear edge is moved against the rear roller mounting bar 66, which is aligned with the work bed backstop 46 and provides an extension of the backstop on the table. Alternatively, in the case of plates and other articles which may be sawed without employing the side table, the articles may be loaded on the machine from the front, inserting them between the upper ends of the front legs 14 and 16 and moving them against the backstop 46.

Adjustable lateral plate margin guide means are mounted on the rear pair of side bars 60 and 62 of the table. The guide means includes mounting plates 70 and 72 secured at opposite ends of the side bars. Two transverse slide rods 74 are mounted on the end plates and extend therebetween. A drive screw 76 is journaled in the mounting plates and is turned by means of a handwheel 78 arranged conveniently at the outer side of the table. A guide block 80 is slidably movable on the slide rods 74. The block is joined to a connecting member 85, which is in threaded driving engagement with the screw 76. An elongated guide bar 82 is mounted in the guide block, and is longitudinally slidable therein. The guide bar is secured in any desired longitudinal position by means of a thumb screw 84 mounted on the block and arranged with suitable means frictionally engaging the bar. The front end 82a of the guide bar extends over the rollers 68 and serves to align the lateral margin of a plate or other article on the table, with the article abutting against the bar. The rear end 82b of the guide bar extends over a scale 86 arranged on a mounting platform 88 on the table. The scale may be graduated in any suitable manner, e.g., it may constitute a pica or point rule as employed by printers.

As seen in FIGS. 4–11, a plurality of universal clamps 90 are mounted on the work bed 36 for securing articles to be sawed on the bed. Each clamp is movably mounted between two support bars 42, and a clamp is mounted in each of the alternate channels 44a, c, e, g, i, and k defined thereby. Each clamp includes a horizontal clamp arm 92 in the form of a rectangular bar extending longitudinally from the front to the rear of the machine. The arms include cam slots 94 and 96 at opposite ends thereof. The bars are movably supported by front and rear brackets 98 and 100 secured to the respective angle bars 38 and 40. The upper ends of the brackets are bifurcated and embrace the ends of the clamp arms, and a pin 102 extends through the upper end of each bracket and through each of the cam slots 94 and 96. The clamp arms thus are longitudinally movable on the brackets. The arms are elevated when they are moved towards the rear and lowered when they are moved towards the front of the machine.

A series of equidistantly spaced parallel clamping elements 104 is mounted on each of the clamp arms 92, from the front of the work bed 36 to the backstop 46. As seen in FIGS. 10 and 11, each element includes a body 106 having a slotted upper end 108 terminating in inclined end surfaces 109. The end surfaces are inclined upwardly and rearwardly, and similarly, the base 110 of the slot is inclined substantially parallel thereto. Each element is pivotally mounted on a clamp arm 92, which is received within the end slot, by means of a pin 112 which extends through the arm and through the slotted end in an off-center position. The lower end of each clamping element body 106 acts as a counterweight and is weighted by a screw 114 or the like in threaded engagement therewith. The clamping elements are normally maintained upright or approximately vertical on each clamp arm, with slotted ends 108 projecting upwardly therefrom. In this position, the elements are stopped from turning in the counterclockwise direction, as viewed in FIG. 10, by engagement of the leading edge 110a of the slot base with the bottom edge of the clamp arm 92. The elements may be turned in the clockwise direction in the manner illustrated in FIG. 11, so that their upper end surfaces 109 are arranged substantially parallel to the upper edge of the clamp arm 92.

The upper ends 108 of the clamping elements 104 are also arranged to project above the support bars 42 and the bed surface 50 in the elevated positions of the clamp arms 92, as seen in FIGS. 7 and 10. The projecting rear corners 108a of the elements are adapted for engaging the forward edge of a plate 48 or other article on the bed. The elements 104 which are located beneath the article are turned by contact with the article to avoid interfere therewith, lowering the corners 108a, to the bed surface, as illustrated in FIGS. 7 and 11. The end surfaces 109 then are disposed generally parallel to the upper surface 50 of the bed and to the base of the article, in contact with the latter.

The clamps 90 are operated to alternately clamp an article 48 on the bed 36 and against the backstop 46, and release the article from clamping engagement. When the article extends to the side table 56, it is clamped against the backstop provided by the mounting bar 66 as well as against the work bed backstop 46. When the clamps are moved to the rear, as shown in FIG. 7, they are elevated by the action of the pins 102 in the cam slots 94 and 96. One clamping element 104 on each clamp arm 92 engages the front edge of the articles 38. By virtue of the universal clamp construction, an article 48 of any length, from front to rear, is automatically clamped in place. The article is engaged by the nearest clamping element 104 disposed forwardly of the article as the elements are elevated to the bed surface 50. Clamping elements rearwardly thereof are pivotally moved by the article 48 as the clamps are elevated, and they assume the non-interfering position illustrated in FIGS. 7 and 11. Clamping elements located forwardly of the engaging element remain in their normal upright positions. The article 48 is released from clamping engagement with the clamps 90 by merely moving the clamp arms 92 forwardly. Clamping tension is released, and the clamps are lowered to positions beneath the bed surface 50, as illustrated in FIG. 9, thus clearing the bed surface.

Figure 6:
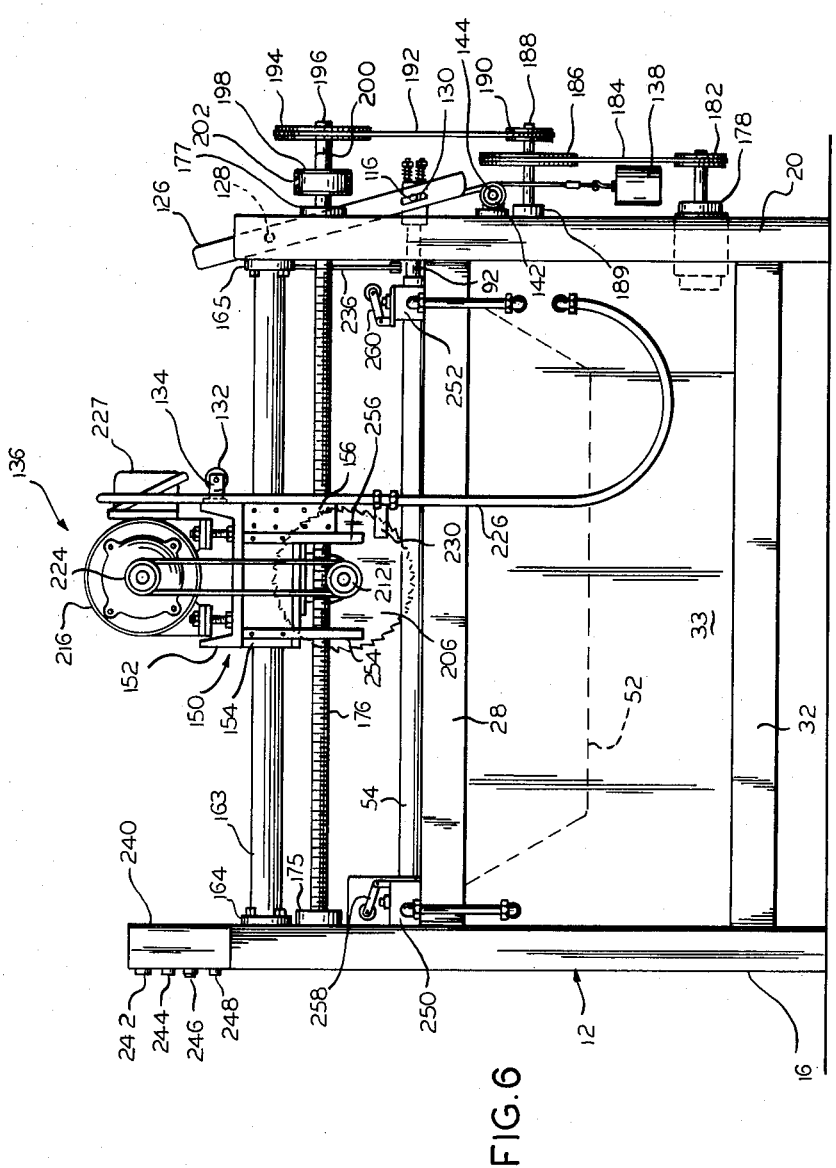
FIG. 6 is a side elevational view of the machine with outer covering removed.

As seen in FIGS. 5-7, the clamp arms 92 are mounted in transversely spaced parallel relation for conjoint operation on a transverse connecting rod 116 located at the rear of the machine. Each arm is resiliently clamped on the rod by spring-pressed inner and outer clamp halves 118 and 120. Bolts 122 are in threaded engagement with the inner clamp halves 118 in turn secured to the clamp arms. The outer clamp halves 120 are slidable on the bolts. Coil compression springs 124 are arranged between the bolt heads and the movable outer clamp halves 120, and they urge the respective clamp halves together into clamping engagement with the rod 116.

The clamp arms 92 are moved longitudinally back and forth by the connecting rod 116. As the rod and the clamp arms are moved rearwardly, certain of the clamping elements 104 engage the article 48, and the clamp arm and elements are placed in tension. The length of stroke is such as to insure that such tension is produced for clamping the article, and the remaining movement of the connecting rod 116 is accommodated by the resilient mounting. Thus, the rod 116 moves rearwardly relative to the clamp arms 92 against the tension of the springs 124, with the clamp halves 118 and 120 spreading apart. The tensions are released when the rod 116 is next moved forwardly to move the clamps 90 forwardly and downwardly.

The connecting rod 116 is operated by a pair of upwardly and forwardly inclined levers 126 connected thereto. The operating levers are secured to a horizontal pivot rod 128 rotatably mounted on and extending between the upper ends of the rear legs 18 and 20, as seen in FIGS. 5 and 6. The connecting rod 116 is received in an elongated slot 130 below the pivot rod and adjacent the lower end of each lever. As described subsequently in greater detail, the operating levers 126 are turned about the axis of the pivot rod by engagement with two rollers 132 secured by means of brackets 134 to a saw head 136. The rollers respectively engage the levers above the pivot rod, and a counterweight 138 is connected to the opposite end of each lever. The counterweights are connected by cables 140 trained on grooved pulleys 142. The pulleys are secured on a transverse shaft 144 rotatably mounted on the legs 18 and 20 at the rear of the machine, as seen in FIG. 6.

The saw head 136 is mounted for reciprocably traversing the work bed 36 in the longitudinal direction. It is illustrated in FIG. 1 with an outer cover or hood 146 thereon, and in FIGS. 4 and 6 with the cover removed. A transparent safety shield or guard door 148 is hingedly mounted on the cover at the front of the head, and it extends downwardly to a location just above the work on the bed. The shield enables the operator to view the operation of the saw head safely.

The saw head 136 includes a carriage 150 spaced above the work bed 36 and mounted for movement between the front and back of the machine. The carriage includes a transverse horizontal channel bar 152 and two slide rod bearing housings 154 (FIGS. 2, 3 and 6) secured on the under surface and at the opposite ends thereof. Screw holders 156 are mounted on and depend from the respective bearing housings. Saw shaft bearings 158 are mounted on and depend from plates 160 secured on the bases of the respective bearing housings.

The carriage 150 is longitudinally movably mounted on two horizontal rods 162 and 163 which function as slide rods or ways and supports for the saw head. The slide rods are disposed on opposite sides of the bed 36 and extend in parallel to each other from the respective front legs 14 and 16 to the corresponding rear legs 18 and 20. The rods are mounted in spaced relation above the work bed and adjacent the upper ends of the legs by means of holders 164 and 165 (FIG. 6). As seen in FIGS. 2 and 3, the shafts extend through the bearing housings 154, where they are slidably enclosed by split tubular bearings 166. The bearings are supported in the housings by split tubular sleeves 168. A takeup rod 170 is in contact with each sleeve for the length of the housing. Set screws 172 extend through the bottom plate 160 and the wall of the housing, and they bear on the rod. Should wear occur, the set screws are tightened to cause the takeup rod to move against the sleeve and maintain the bearing in close fitting relation to the slide rod.

The carriage 150 is driven by two horizontal drive screws 174 and 176 disposed on opposite sides of the work bed 36 beneath and parallel to the respective slide rods 162 and 163. The screws are rotatably mounted in bearings 175 and 177 (FIG. 6) secured to the respective front legs 14 and 16, and rear legs 18 and 20. The screws threadedly engage the screw holders 156 for driving the carriage back and forth over the bed. The slide rods and the drive screws lie in respective horizontal planes spaced above the bed, affording room thereunder for an article to be sawed. In particular, an article may be moved on the rollers 68 under the adjacent rod 162 and the screw 174. The article may extend thereunder from the table 56 to the work bed 36 when it is sawed, and an article may be clamped in any desired position between the adjustable guide bar 82 and the opposite margin of the bed, which borders the channel 44k.

Referring particularly to FIG. 6, the screws 174 and 176 are driven synchronously in either of opposite directions by a reversible motor 178. The motor is mounted on a rear leg 18 and enclosed by a housing 180, as seen in FIG. 1. The motor is coupled to the screws by pulley and belt drive means. A pulley 182 is mounted on the motor shaft and is connected by a belt 184 to a large pulley 186 mounted on a shaft 188. The shaft 188 is rotatably mounted in a bearing 189 on the leg 18. A small pulley 190 is mounted on the latter shaft, and it is connected by a belt 192 to a larger pulley 194. This pulley is mounted on a shaft 196 joined to or integral with one drive screw 174. Two like pulleys 198 are mounted respectively on the latter shaft 196 and a shaft 200 connected to or integral with the second drive screw 176. The pulleys 198 are connected by a drive belt 202, so that the screws are driven together in the same direction of rotation. The foregoing assembly is enclosed by an outer cover 203, which closes the back of the machine (see FIG. 1).

A saw shaft 204 is rotatably mounted in the bearings 158 (FIGS. 2 and 3). The shaft carries a plurality of circular saw blades 206, of which there are six in the illustrative embodiment. The blades are constructed in two halves for ease of adjustment and replacement, and they are secured on the shafts by hub elements 208. Drive pulleys 210 and 212 are secured at opposite ends of the saw shaft, as seen in FIGS. 4 and 6. The respective pulleys are driven by saw motors 214 and 216 mounted on the channel 152. The pulleys are coupled thereto by respective belts 218 and 220 and pulleys 222 and 224 on the motor shafts. The motors are operated synchronously, and are supplied with power through a junction box 227, by a flexible electrical conductor 226 extending from the base of the machine. A warning light 228 is also mounted on the channel 152, and is visible through the cover 146, as seen in FIG. 1.

Referring to FIGS. 5–7, the two brackets 134 carrying rollers 132 as previously described, are secured on the back side of the saw head channel 152 and are spaced apart in positions corresponding to the disposition of the operating levers 126 which engage the connecting rod 116. The rollers contact the levers when the saw head 136 is in its rear or retracted, non-sawing position illustrated in FIG. 1. In this position, the levers are moved clockwise about the pivot rod 128 from their positions illustrated in FIG. 7. The clamps 90 are in their forward release positions illustrated in FIG. 9, disposed below the surface 50 of the bed. When the saw head is moved forwardly from its retracted position into its sawing position or sawing traversing path, the rollers 132 move away from the levers 126, and the levers are moved in the counterclockwise direction by the counterweights 138. The clamps 90 are moved to the rear and elevated into their clamping positions illustrated in FIG. 7. They remain in this position until the saw head is moved to the rear, when the rollers thereon once more engage the operating levers and move the levers in the clockwise direction, to return the clamps to positions below the bed surface.

Referring to FIGS. 4 and 5, the saw blades 206 extend beyond the bed grate surface 50 into the respective alternate channels 44b, d, f, h and j, and the right-hand saw blade 206b extends between the outermost clamp channel 44k and the chute flange 54. The saw blades are spaced apart for predetermined distances corresponding to the widths of sections to be cut from the plate or other article 48. In the illustrative embodiment, the successive pairs of blades are spaced apart in newspaper column widths, corresponding respectively from left to right to 1, 2, 1, 3, and 1 column widths, for a total width of eight columns between the outside blades 206a and 206b. When it is desired to cut a plate into sections having other widths, and especially where a width larger than three columns is desired, part or substantially all of the plate may be arranged on the side table 56. The guide block 80 is moved to set the guide bar 82 on the scale 86 at the desired width of the marginal section of the plate, extending between the guide bar end 82a and the saw blade 206a adjacent to the table.

When the sawing machine 10 is in operation, the saw head 136 is driven forwardly by the drive motor 178, and the saw blades 206 are driven by the saw motors 214 and 216. As the saw head moves forwardly, the operating levers 126 are moved by the counterweights 138 to elevate the clamps 90. By the time the saw blades reach the article 48, the saw head has disengaged from the operating levers, and the clamps securely hold the article against the backstop 46, as shown in FIG. 7 The saw blades then cut the article into sections as the saw head travels to the front of the bed. The cuttings drop through the bed and into the chute 52. A slotted safety bar 230 (FIGS. 4 and 6) is suspended from the channel 152 by vertical support bars 232. The lower rear quadrants of the saw blades extend into the slots of the safety bar. The bar dislodges any articles being sawed that tend to be lifted by the saw blades as the blades travel upwardly at the rear. A canvas shield 234 or the like (FIG. 2) extends downwardly from the back side of the channel 152 to prevent ejection of loose material at the back of the saw head, and a similar shield 236 (FIG. 6) extends across the back of the machine adjacent the rear legs, between the saw head and the operating apparatus mounted at the back.

A clamp 90 is disposed between each pair of saw blades 206, and one clamp is disposed between the saw blade 206a adjacent the table and the guide bar 82, so that a clamp engages each section of the article as it is being sawed and after the sections have been severed completely. The sawing operation is thereby rendered safe and accurate.

When the saw head 136 reaches its forward limit of travel, it is stopped and movement of the saw blades is stopped, both automatically. The drive motor 178 is reversed, either automatically or manually, and the saw head then travels to the rear with the saw blades inoperative. The blades pass through the cuts in the work. When they have cleared the work, the clamps are disengaged therefrom and moved beneath the bed surface 50 by engagement of the saw head with the operating levers 126. When the saw head reaches its starting position at the rear limit of travel, it is automatically stopped. At this time, the sawed sections may be removed from the work bed.

The sawed sections may be turned 90 degrees on the work bed and sawed into appropriate depths equivalent to the several column widths. A number of sections may be arranged in a row extending from the backstop 46 towards the front of the bed. Any number of sections up to the capacity of the bed may be sawed at one time, and the universal clamps 90 serve to hold them in place whatever be their number. The sawing operation is conducted in the same manner as with a single article, and it produces a group of blocks having various widths and depths. For example, a base plate may be cut in this manner into blocks corresponding to the column dimensions 1 x 1, 1 x 2, 1 x 3, 2 x 2, 2 x 3, and so forth.

Referring especially to FIGS. 1 and 6, the operation of the sawing machine 10 is electrically controlled from a control box 240 on one front leg 14. The controls include a reset button 242, a start button 244, a manual-automatic switch 246 and a stop button 248. Operation is also controlled by front and rear limit switches 250 and 252, respectively, mounted on the upper right side crossbar 28 adjacent the respective front and rear legs 16 and 20. Front and rear trip bars 254 and 256 are secured on the right side of the saw head carriage 150 and depend therefrom. The trip bars are arranged for respective engagement with resiliently supported actuating levers 258 and 260 on the respective switches 250 and 252. The remaining electrical apparatus for operation of the machine is housed in a cabinet 262 mounted externally on the left side wall panel 31.

Figure 12:
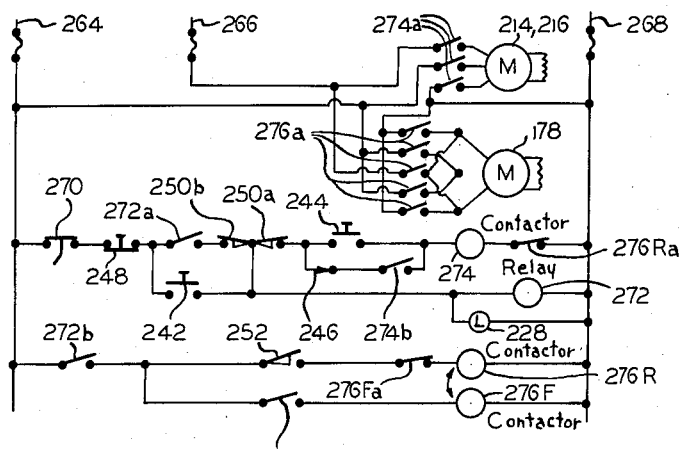
FIGS. 12–14 are simplified schematic circuit diagrams of the machine, respectively corresponding to several successive stages in the operation thereof.
Figure 13:
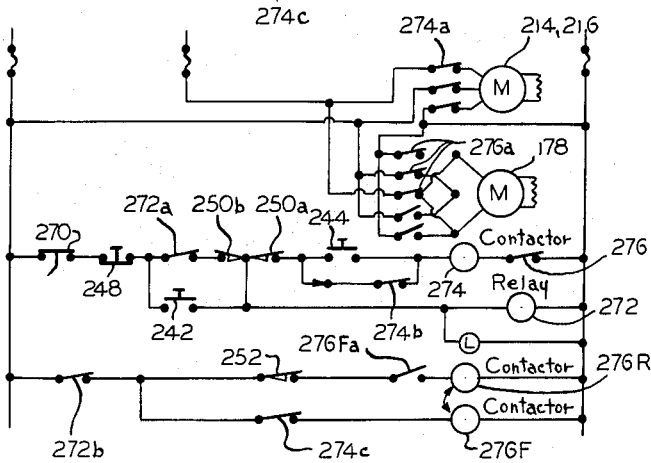
Figure 14:
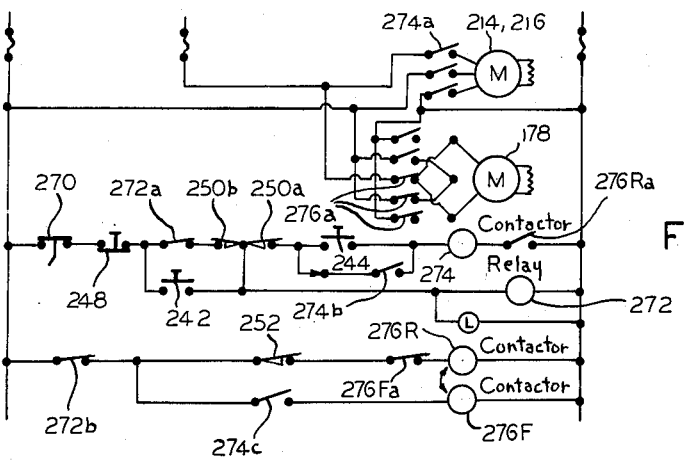

The sequence of operations as controlled electrically for operating the machine semiautomatically is illustrated in FIGS. 12–14, wherein the same reference symbols are applied to the schematic representations of structures illustrated in the preceding views. The numbers 264, 266, and 268 identify electrical leads to a power source. The number 270 identifies one of a group of bimetallic overload switches that open if the drive motor 178 or either of the saw motors 214 and 216 is overloaded. The number 272 identifies a holding relay which operates two reset switches 272a and 272b. Two switches 250a and 250b are operated by the forward limit switch 250, this switch 250b being optional. A saw motor contactor is identified by the number 274, and it operates switches identified by the number 274a in the lines to the saw motors 214 and 216. The contactor also operates switches 274b and 274c. Reverse and forward drive motor contactors are respectively identified as 276R and 276F. The contactors are connected by a mechanical interlock, as represented by the curved arrow, so that only one can operate at a time. A group of switches 276a in lines to the reversible drive motor 178 is operated by the contactors 276R and 276F. A switch 276Fa is operated by the forward contactor 276F. A switch 276Ra is operated by the reverse contactor 276R.

FIG. 12 represents the condition of the controls when the sawing machine is in its starting position illustrated in FIG. 1 and is shut down. The overload switch 270, the stop switch 248, the front limit switches 250a and 250b, and the drive motor contactor-operated switches 276Fa and 276Ra are closed, and the manual-automatic switch 246 is in its closed position for automatic operation. The remaining switches are open.

By pressing the reset button 242 and then the start button 244, the respective switches close temporarily, after which the controls are in the condition illustrated in FIG. 13 and the warning light 228 is on. At this time, the switches 274a in the lines to the saw motors 214 and 216 are closed, and the motors operate to drive the saw blades. The switch 272b in the line to the drive motor contactors and the switch 274c in the line to the forward contactor 276F are closed. The switch 276Fa in the line to the reverse contactor 276R is open. Three of the switches 276a in the lines to the drive motor 178 are closed by the forward contactor, and the saw head 136 is driven forward. When the rear saw head trip bar 256 moves out of engagement with the rear limit switch 252, the switch closes.

When the saw head 136 reaches its forward limit of travel with the front trip bar 254 engaging the front limit switch 250, the switches 250a and 250b open. The controls then are otherwise in the condition illustrated in FIG. 12, except that the rear limit switch 252 is closed, and the warning light 228 is off.

The saw head 136 is moved in the reverse direction by pressing the reset button 242 to close the corresponding switch, and continuing to press the button until the saw head front trip bar 254 becomes disengaged from the front limit switch 250. The switches 250a and 250b then close, and the controls are in the condition illustrated in FIG. 14, with the warning light 228 on. Alternatively, the same condition may be reached automatically by by-passing the optional switch 250b.

At this time, the rear limit switch 252 and the switches 272b and 276Fa in the line to the reverse contactor 276R are closed. A second group of three switches 276a in the lines to the drive motor 178 are closed, so that the motor turns in the reverse direction and drives the saw head to the rear. The contactor 274 cannot be energized by pressing the start button 244 while the front limit switch 250a is open. Thereafter, the switch 276Ra in the contactor line is open. With the contactor 274 de-energized, the switches 274a for the saw motors are open, and the saw blades are inoperative. The switch 274c in the line to the forward contactor 276F is also open.

When the saw head 136 reaches its rear limit of travel with the rear trip bar 256 engaging the rear limit switch 252, the limit switch opens. The drive motor switches 276a open, and the switch 276Ra closes. The relay 272 remains energized, so that the switches 272a and 272b remain closed. The warning light 228 remains on. The cycle of saw head operation may be repeated by pressing the start button 244 to close the corresponding switch. Alternatively, the relay 272 may be de-energized and the machine completely shut down with the warning light out by pressing the stop button 248 to open the corresponding switch. The controls then are in the condition illustrated in FIG. 12.

In the event that it is desired to stop the machine at any stage of its operation, the stop button 248 is pressed to open the corresponding switch. The saw head rear trip bar 256 having cleared the rear limit switch 252 so that the switch is closed, the saw head is returned to its starting position by pressing the reset button 242, in like manner to the operation when the saw head has stopped at its forward limit of travel. The overload switch 270 operates like the stop switch 248 when the drive motor or a saw motor is overloaded. The saw head is returned to its starting position by pressing the reset button 242 when the overload switch closes.

When it is desired to operate the machine manually, the manual-automatic switch 246 is placed in its open position. The start button 244 is held depressed to maintain its switch closed so long as the machine is to operate. When the start button is released during forward movement of the saw head, the controls then being as shown in FIG. 13 but operating manually, the saw motor switches 274a open to stop the saw blades. The switch 274c in the line to the forward contactor 276F opens, and the switch 276Fa in the line to the reverse contactor 276R closes. The saw head then returns to its starting position with the saw blades inoperative. Once the saw head reaches the forward limit of travel during manual operation, it is operated in the same manner as with the manual-automatic switch closed for automatic operation, by depressing the reset button 242 until the forward limit switch 250 is disengaged and the corresponding switches 250a and 250b close.

The invention thus provides a sawing machine which operates automatically or semiautomatically after being started, to saw plates or other articles accurately into sections and then withdraw the saw head, with the work being securely clamped on the bed until the operation is complete. The machine is very compact while providing a large selection of sizes of sections into which an article may be sawed. In the illustrative embodiment which is especially adapted for sawing stereotype base plates into blocks for printing operations, the blocks may range in width and depth from one to eight-column sizes. Any size article up to the combined capacity of the saw head and the table may be sawed, and a group of articles may be sawed at one time. The sawing accuracy is such that the cut edges need not be trimmed. The construction requires relatively little maintenance and provides long-lasting sawing accuracy. The machine operates safely and reliably in providing large scale production of sawed articles.

It will be apparent that various changes and modifications may be made in the construction and arrangement of the components of the machine within the spirit and scope of the invention. It is intended that such changes and modifications be included within the scope of the appended claims.

We claim:

1. A sawing machine which comprises a bed for supporting an article to be sawed on a surface thereof, a saw head mounted for reciprocable traversing movement along a path relative to said bed, clamp means for clamping an article to be sawed on said bed surface, said clamp means comprising a clamp arm and a plurality of counterweighted clamping elements pivotally mounted on said arm and normally projecting upwardly therefrom for respective clamping engagement with the edges of different articles, said arm being movable from a release position with said elements disposed below said surface to a clamping position with said elements normally projecting above the surface, said elements not engaging an article and located beneath the article being pivotally moved thereby to avoid interference therewith, and means in the path of and adapted to be engaged by said saw head for moving said arm in response to said traversing movement of the saw head, to clamp an article on said bed as said saw head moves in a direction to saw the article and to release the article as said saw head moves in a reverse direction.

2. A sawing machine which comprises a bed grate for supporting a plate to be sawed on a surface thereof and having a plurality of parallel longitudinal channels therein adjacent said surface, a saw head mounted for longitudinally reciprocably traversing said grate along a path, a plurality of transversely spaced driven saw blades in said saw head and extending beyond said grate surface into said channels, a plurality of transversely spaced plate clamps disposed between said saw blades for clamping a plate to be sawed on said grate surface, said clamps each comprising a clamp arm and a plurality of counter-weighted clamping elements freely pivotally mounted on said arm and normally projecting upwardly therefrom for respective clamping engagement with the edges of different length plates, said clamps being movable in said channels from release positions below said surface to clamping positions with said elements normally projecting above the surface, said elements not engaging a plate and located beneath the plate being pivotally moved thereby to avoid interference therewith, and means in the path of and adapted to be engaged by said saw head for moving said clamps in response to said traversing movement of the saw head, to clamp a plate on said grate as said saw head moves in a direction to saw the plate and to release the plate as said saw head moves in a reverse direction.

3. A sawing machine as defined in claim 2 and including adjustable lateral plate margin guide means for varying the width of a marginal section into which said plate is sawed.

4. In a sawing machine including a bed for supporting an article to be sawed on a surface thereof and a saw head mounted for movement from a retracted position into and along a traversing sawing path relative to said bed, means for clamping an article to be sawed on said bed comprising a clamp arm, a plurality of clamping elements freely movably mounted on said arm and normally projecting upwardly therefrom for respective clamping engagement with the edges of different length articles, said arm being movable between a release position with said elements disposed below said surface and a clamping position with said elements normally projecting above the surface, said elements not engaging an article and located beneath the article being moved thereby to avoid interference therewith, and means for moving said arm between said release and clamping positions in response to movement of said saw head.

5. In a sawing machine including a bed for supporting an article to be sawed on a surface thereof and a saw head mounted for movement from a retracted position into and along a traversing sawing path relative to said bed, means for clamping an article to be sawed on said bed comprising a clamp arm, a plurality of clamping elements pivotally mounted on said arm and normally projecting upwardly therefrom for respective clamping engagement with the edges of different length articles, said arm being movable between a release position with said elements disposed below said surface and a clamping position with said elements normally projecting above the surface, said elements not engaging an article and located beneath the article being pivotally moved thereby to avoid interference therewith, and means for moving said arm between said release and clamping positions in response to movement of said saw head.

6. In a sawing machine including a bed for supporting an article to be sawed on a surface thereof and a saw head mounted for reciprocable traversing movement along a path relative to said bed, means for clamping an article to be sawed on said bed comprising a clamp arm, means mounting said arm for reciprocable vertical and horizontal compound movement below said surface, a plurality of clamping elements freely movably mounted on said arm and normally projecting upwardly therefrom for respective clamping engagement with the edges of different length articles, said arm being movable between a release position with said elements disposed below said surface and a clamping position with said elements normally projecting above the surface, said elements not engaging an article and located beneath the article being moved thereby to avoid interference therewith, an operating lever having an elongated slot therein, a connecting rod rotatably received in said slot and connected to said arm, means mounting said lever for reciprocable pivotal movement about a horizontal axis spaced apart from said slot, said lever being mounted in the path of and adapted to be engaged by said saw head for reciprocating the lever in one direction as the saw head moves into engagement therewith, and a counterweight on said lever for reciprocating the lever in the opposite direction as the saw head moves out of engagement therewith, whereby said arm is reciprocated between said release and clamping positions in response to said traversing movement of said saw head, to clamp an article on said bed as said saw head moves in a direction to saw the article and to release the article as said saw head moves in a reverse direction.

7. A sawing machine which comprises a bed for supporting an article to be sawed on a surface thereof, a saw head mounted for longitudinal reciprocable traversing movement along a path relative to said bed, a table laterally adjoining said bed, guide means laterally movable on said table for locating a lateral margin of an article to be sawed relative to said saw head, means for laterally adjusting the position of said guide means relative to said table, and means for clamping an article to be sawed on said bed comprising a clamp arm, a plurality of clamping elements pivotally mounted on said arm and normally projecting upwardly therefrom for respective clamping engagement with the edges of different length articles, said arm being movable between a release position with said elements disposed below said surface and a clamping position with said elements normally projecting above the surface, said elements not engaging an article and located beneath the article being pivotally moved thereby to avoid interference therewith, and means for moving said arm between said release and clamping positions in response to movement of said saw head, to clamp an article on said bed as said saw head moves in a direction to saw the article and to release the article as said saw head moves in a reverse direction.

References Cited by the Examiner

UNITED STATES PATENTS

| | | | |
|---|---|---|---|
| 560,064 | 5/96 | Hodgson | 83—419 |
| 724,578 | 4/03 | Hungerford | 143—47 X |
| 1,732,148 | 10/29 | Barrett | 83—383 |
| 1,761,351 | 6/30 | Kutscheid | 83—384 |
| 1,839,969 | 1/32 | Kazanji | 83—489 X |
| 1,871,334 | 8/32 | McNeill | 83—384 |
| 1,976,020 | 10/34 | Hilke | 143—47 X |

FOREIGN PATENTS

| | | |
|---|---|---|
| 210,753 | 10/57 | Australia. |
| 619,648 | 5/61 | Canada. |
| 418,013 | 10/34 | Great Britain. |

ANDREW R. JUHASZ, *Primary Examiner.*

LEON PEAR, *Examiner.*